United States Patent
Tscharnuter

(10) Patent No.: US 12,090,631 B2
(45) Date of Patent: Sep. 17, 2024

(54) ROBOTIC ARM COMPRISING A HUMAN-MACHINE INTERFACE

(71) Applicant: KUKA Deutschland GmbH, Augsburg (DE)

(72) Inventor: Dietmar Tscharnuter, Friedberg (DE)

(73) Assignee: KUKA Deutschland GmbH, Augsburg (DE)

( * ) Notice: Subject to any disclaimer, the term of this patent is extended or adjusted under 35 U.S.C. 154(b) by 584 days.

(21) Appl. No.: 17/292,845

(22) PCT Filed: Oct. 30, 2019

(86) PCT No.: PCT/EP2019/079602
§ 371 (c)(1),
(2) Date: May 11, 2021

(87) PCT Pub. No.: WO2020/099129
PCT Pub. Date: May 22, 2020

(65) Prior Publication Data
US 2021/0323169 A1 Oct. 21, 2021

(30) Foreign Application Priority Data
Nov. 12, 2018 (DE) .................... 10 2018 219 268.5

(51) Int. Cl.
*B25J 13/06* (2006.01)
*B25J 9/16* (2006.01)
(Continued)

(52) U.S. Cl.
CPC ............ *B25J 13/06* (2013.01); *B25J 9/1676* (2013.01); *B25J 13/084* (2013.01); *G06F 3/044* (2013.01)

(58) Field of Classification Search
CPC ........ B25J 13/06; B25J 9/1676; B25J 13/084; G06F 3/044; G09F 9/301; G09F 9/33
See application file for complete search history.

(56) References Cited

U.S. PATENT DOCUMENTS 6,131,299 A * 10/2000 Raab .................. G01B 21/04
33/503
8,417,371 B2 * 4/2013 Werfeli ............... G06F 3/04886
700/83
(Continued)

FOREIGN PATENT DOCUMENTS

CN 203622451 U 6/2014
DE 19928519 A1 1/2000
(Continued)

OTHER PUBLICATIONS

International Search Report dated May 22, 2020 for PCT/ EP2019/ 079602.
(Continued)

*Primary Examiner* — Kira Nguyen
(74) *Attorney, Agent, or Firm* — Bachman & LaPointe, P.C.

(57) ABSTRACT

The invention relates to a robot arm (2), having a plurality of joints (5) and a plurality of links (4), which each connect two adjacent joints (5) to one another, wherein at least one of said links (4) has a human-machine interface (6), comprising at least one display means (7, 7.2), which is designed to display at least one system state of the robot arm (2) and/or of a control device (3) connected in terms of control technology to the robot arm (2), and comprising at least one input means (8), which is designed to supply at least one manual input via the human-machine interface (6) to the robot arm (2) and/or to a control device (3) connected in terms of control technology to the robot arm (2), wherein the at least one input means (8) comprises a tactile sensor surface (8.1) arranged on an outer casing wall (M) of the link (4) and the at least one display means (7, 7.2) comprises a display surface (7.1) superimposed on the tactile sensor surface (8.1).

19 Claims, 3 Drawing Sheets

(51) Int. Cl.
*B25J 13/08* (2006.01)
*G06F 3/044* (2006.01)

(56) References Cited

U.S. PATENT DOCUMENTS

| | | | | |
|---|---|---|---|---|
| 2008/0147239 | A1* | 6/2008 | Chiang | B25J 13/084 |
| | | | | 700/264 |
| 2011/0036181 | A1 | 2/2011 | Fritzsche et al. | |
| 2018/0079090 | A1* | 3/2018 | Koenig | G01L 3/14 |
| 2018/0290301 | A1* | 10/2018 | Haddadin | B25J 9/1664 |
| 2018/0354141 | A1* | 12/2018 | Haddadin | B25J 9/1664 |

FOREIGN PATENT DOCUMENTS

| | | |
|---|---|---|
| DE | 102004054867 A1 | 5/2006 |
| DE | 102014107642 A1 | 12/2015 |
| DE | 102015117211 B3 | 10/2016 |
| DE | 202015104886 U1 | 12/2016 |
| DE | 102015012961 A1 | 4/2017 |
| DE | 102016210846 A1 | 9/2017 |
| EP | 1566246 A1 | 8/2005 |
| EP | 2528234 B1 | 7/2013 |
| EP | 3147752 A1 | 3/2017 |
| JP | 2012218139 A | 11/2012 |

OTHER PUBLICATIONS

German Office Action dated Aug. 28, 2019 for German Patent Application No. 10 2018219268.5.
Chinese Office Action dated Jul. 22, 2023 for Chinese Patent Application No. 201980074441.7.

\* cited by examiner

ROBOTIC ARM COMPRISING A HUMAN-MACHINE INTERFACE

BACKGROUND

The invention relates to a robot arm, having a plurality of joints and a plurality of links, which each connect two adjacent joints to one another, wherein at least one of said links has a human-machine interface, comprising at least one display means, which is designed to display at least one system state of the robot arm and/or of a control device connected in terms of control technology to the robot arm, and comprising at least one input means, which is designed to supply at least one manual input via the human-machine interface to the robot arm and/or to a control device connected in terms of control technology to the robot arm.

EP 1 566 246 A1 discloses a robot having a display device, which makes it possible for an operator to refer to information required for inspections or the like without having to use a printed manual or a display screen of a teaching counterpart. The display device has a flexible screen, which has organic light-emitting diodes, a control unit and a plug. The display device plug is inserted into a connector provided at a suitable location on the robot arm, wherein the display unit is lightly pressed onto the surface of the robot arm. The surface of the robot arm can in this case be curved or flat.

SUMMARY

The object of the invention is to provide a robot arm with a human-machine interface that can be operated in a particularly ergonomic manner, in particular can be actuated manually.

According to the invention, said object is achieved by a robot arm, having a plurality of joints and a plurality of links, which each connect two adjacent joints to one another, wherein at least one of said links has a human-machine interface, comprising at least one display means, which is designed to display at least one system state of the robot arm and/or of a control device connected in terms of control technology to the robot arm, and comprising at least one input means, which is designed to supply at least one manual input via the human-machine interface to the robot arm and/or to a control device connected in terms of control technology to the robot arm, wherein the at least one input means comprises a tactile sensor surface arranged on an outer casing wall of the link, the at least one display means comprises a display surface superimposed on the tactile sensor surface and the human-machine interface has a configuration device, which actuates the display means and the input means and which is set up to visually highlight a certain partial surface section of the tactile sensor surface due to the superimposed arrangement of the display surface and the tactile sensor surface by illuminating said partial surface section of the tactile sensor surface of the input means by means of the display means and to activate said visually highlighted partial surface section of the tactile sensor surface separately in terms of control technology in such a way that, in the case of a compressive force exerted on said activated partial surface section of the tactile sensor surface, a signal associated in terms of control technology with said partial surface section by the configuration device is generated and fed to an evaluation device of the human-machine interface.

In general, a robot comprises a robot arm, that is to say the so-called kinematics, and a control device that controls the robot arm, that is to say a robot controller. In addition to its functionality for driving the movements of the robot arm, the robot controller can also have further supplementary control components or control functionalities. Said further supplementary control components or control functionalities can be the configuration device of the human-machine interface according to the invention and/or the evaluation device of the human-machine interface according to the invention. The configuration device according to the invention and/or the evaluation device according to the invention can, however, be designed to be separate from the robot controller. The configuration device according to the invention and/or the evaluation device according to the invention can be, in particular, part of the structural unit of the human-machine interface. The configuration device according to the invention and/or the evaluation device according to the invention can accordingly be arranged, for example, outside the robot arm or can be part of the robot arm, that is to say, in particular, can be arranged inside the robot arm.

The human-machine interface represents a user interface by way of which a person can enter into communication with the robot or with the robot controller thereof. The communication can be unidirectional or bidirectional. The communication—in one direction—can consist of the robot or the robot controller notifying the person of a specific state of the robot or the robot controller thereof. This can be done using at least one display means. In the simplest case, the display means can be a light that lights up as soon as a specific assigned state occurs. The communication—in the other direction—can consist of the person making an input in order to notify the robot or the robot controller of a command or a desired change of state for the robot or the robot controller. This can be done using at least one input means. In the simplest case, the input means can be a button or a switch, upon the manual actuation of which the robot or the robot controller carries out a specific change of state. For example, this can even be switching the robot on or off.

In the case of the present invention, various display means can be provided. Certain display means can be designed in accordance with the prior art and only display certain system states. In particular, at least one display means is used according to the invention to visually highlight a partial surface section of a tactile sensor surface of the robot arm in order to visually indicate to a person that precisely this partial surface section of the tactile sensor surface is activated as an input means, so that an input can be made by actuating said partial surface section of the tactile sensor surface. The desired partial surface section of the tactile sensor surface, that is to say that is activated as an input means, can be illuminated directly or illuminated indirectly by the display means according to the invention.

Manual inputs at the human-machine interface can be made by a person by virtue of them pressing the input means, for example by means of a finger of the person's hand, wherein the manually applied pressure on the input means is converted to an electrical signal, for example, which is fed to the evaluation device or the robot controller, wherein the evaluation device or the robot controller is set up to establish a specific assigned system state on the basis of the signal.

A representative process is, for example, the selection and activation of a specific axle of the robot arm, that is to say a specific joint of the robot arm, that is to be moved in a manually controlled but motor-driven manner by a first input means. Said selected and activated joint of the robot arm can then be moved by means of at least one second input means, for example either by the person manually pressing a plus button or the person manually pressing a minus button in order to move said joint of the robot arm, which can be, in particular, a swivel joint, in a motor-driven, but manually controlled, manner clockwise or counter-clockwise.

The outer casing wall of the relevant link, which has the human-machine interface according to the invention, can be a housing shell of the relevant link. The outer casing wall of the relevant link can be the outer wall of a supporting structural component of the link. The outer casing wall of the relevant link can, however, also be some other cover, cladding or a holding device, provided this is designed to make the human-machine interface accessible to a person from outside the robot arm.

The tactile sensor surface can be designed to extend only over part of the total surface of the relevant link of the robot arm. However, the tactile sensor surface can be designed to extend at least substantially or completely over the total surface of the relevant link of the robot arm. In addition to its functionality according to the invention as part of a human-machine interface, the tactile sensor surface can particularly also be set up, that is to say configured, with a functionality for collision detection of the robot arm with another object. This means that the tactile sensor surface according to the invention, in a specific embodiment, can optionally be used both as part of the human-machine interface and as part of a collision detection system.

According to the invention, the tactile sensor surface is at least designed and set up to be able to detect, that is to say automatically perceive, a hand, a finger or another body part, for example, of a person coming into contact with the robot arm at the appropriately configured point, that is to say on the partial surface section. For example, the tactile sensor surface can be constructed from a large number of pressure sensors arranged in a spatially distributed manner. The pressure sensors are designed in this case to detect acting forces, if necessary also to measure their magnitude.

Alternatively, however, the tactile sensor surface can optionally also operate without pressure or almost without pressure, for example in the case where the tactile sensor surface is made up of a large number of capacitive sensors arranged in a spatially distributed manner. In this case, a corresponding change in the capacitance of the capacitive sensors can already be perceived when, for example, a hand, a finger or another part of the person's body touches the tactile sensor surface only lightly without exerting any significant pressure in the process. Nevertheless, within the scope of the invention, a pressure force is discussed, even if this "pressure force" can be almost or completely "zero".

Tactile sensor surfaces that are able to be used, for example, within the scope of the invention can be designed, for example, in accordance with EP 2 528 234 B 1.

The feature of the superimposed arrangement of the display surface and the tactile sensor surface can preferably be effected in such a way that the display surface is designed as a thin layered structure that is placed on the tactile sensor surface or connected to the tactile sensor surface in the manner of a sandwich structure. It is also possible that, in the case of a (partially) transparent design of the tactile sensor surface, the display surface can be arranged behind the tactile sensor surface. If necessary, in a specific embodiment, the display surface can also be arranged next to the tactile sensor surface, provided that the display surface or the display means is suitable for illuminating the desired partial surface section of the tactile sensor surface.

Illuminating the tactile sensor surface should be understood in general to mean that the display means is designed and set up to visually highlight the desired partial surface section of the tactile sensor surface. This primarily means that the display means illuminates the partial surface section of the tactile sensor surface. In specific modifications, however, visual highlighting can also be achieved, for example, in that the desired partial surface section of the tactile sensor surface is highlighted in that it is not this partial surface section that is directly irradiated but, for example, the partial surface section is visually emphasized by a frame-like border of the partial surface section, which is produced by means of illuminating by means of the display means. The reverse is also possible, namely that almost the entire tactile sensor surface is illuminated by the display means and only the desired and activated partial surface section of the tactile sensor surface is left unilluminated.

The configuration device can be designed to dynamically illuminate either a first partial surface section of the tactile sensor surface or a second partial surface section of the tactile sensor surface different from the first partial surface section.

Since the configuration device is designed to dynamically illuminate either a first partial surface section of the tactile sensor surface or a second partial surface section of the tactile sensor surface different from the first partial surface section, a specific input means can optionally be functionally represented at different points on the surface of the relevant link of the robot arm. If several links of the robot arm have tactile sensor surfaces and display means, the specific input means can optionally be functionally represented on the one link or on one of the other links.

The configuration device can accordingly be designed to illuminate the optional first partial surface section of the tactile sensor surface or the optional second partial surface section of the tactile sensor surface with a similar representation, upon touching of which the same signal is generated in terms of control technology in order to activate the same function in both dynamic configurations.

Since the configuration device is designed to dynamically illuminate either a first partial surface section of the tactile sensor surface or a second partial surface section of the tactile sensor surface different from the first partial surface section, it can also be provided, however, that at the same point of a link, that is to say at the same first partial surface section, for example, different types of input means can be functionally represented at different moments. In this way, a respective specific input means can be displayed and functionally represented at a precise point on the link and is replaced by another specific input means at the same point. Which input means is specifically represented can, for example, result from the system state of the robot arm or the programming state, in particular of the robot controller. For example, the input means that is likely to be most useful can always be displayed.

The configuration device can be designed, for example, to dynamically illuminate either a first partial surface section of the tactile sensor surface or a second partial surface section of the tactile sensor surface different from the first partial surface section depending on the current joint positions of the robot arm.

Thus, for example, the input means can be functionally represented in a first joint position on an upper side of a link and, in the case of a pivoting of said link through 180 degrees, said input means on the same link can, however, be shown as previously functional on an opposite partial surface section of said link, so that even with an orientation of the link, pivoted by 180 degrees, said input means is still functionally represented on the upper side.

The configuration device can accordingly be designed to maintain the shape of the visually highlighted partial surface section of the tactile sensor surface and, in the event of a change in the current position and/or orientation of that link of the robot arm that has the human-machine interface, to dynamically adapt the visually highlighted partial surface section of the tactile sensor surface with regard to its position and/or orientation in such a way that a virtual input means generated by the visual highlighting of the partial surface section of the tactile sensor surface maintains its position and/or orientation in space.

The configuration device can be designed to dynamically illuminate either a first partial surface section of the tactile sensor surface or a second partial surface section of the tactile sensor surface different from the first partial surface section depending on the position of a person operating the human-machine interface relative to the robot arm.

For example, even if the joint positions of the robot arm remain the same, it can be expedient to move the input means from one side of the respective link to the opposite side of the link when a person, that is to say a programmer of the robot, for example, changes his position from one side of the robot arm to the other side of the robot arm.

The tactile sensor surface of the at least one link of the robot arm that has the human-machine interface can be designed and set up to detect unintentional collisions of the link with other objects, wherein, however, that partial surface section of the tactile sensor surface that is activated to form the input means in such a way that, when said activated partial surface section of the tactile sensor surface is touched, a signal assigned in terms of control technology to said partial surface section by the configuration device is generated, is deactivated for detection of an unintentional collision.

In this way, it is possible to avoid an intended manual input at the human-machine interface by pressing a button being mistakenly interpreted in terms of control technology as an unintentional collision.

The tactile sensor surface of the at least one link of the robot arm that has the human-machine interface can be designed and set up to detect unintentional collisions of the link with other objects and, in relation to a collision event, only generates a first signal characterizing the unintended collision when the collision force exceeds a predetermined compressive force limit value, wherein that partial surface section of the tactile sensor surface that is activated to form the input means in such a way that, when said activated partial surface section of the tactile sensor surface is touched, a signal assigned in terms of control technology to said partial surface section by the configuration device is generated, a second signal characterizing an input is generated only when the input force is below the predetermined compressive force limit value.

In this way, too, it is possible to avoid an intended manual input at the human-machine interface by pressing a button being mistakenly interpreted in terms of control technology as an unintentional collision.

Alternatively or additionally, the tactile sensor surface of the at least one link of the robot arm that has the human-machine interface can be designed and set up to form a consent switching means, wherein that partial surface section of the tactile sensor surface that is activated to form the consent switching means, when said activated partial surface section of the tactile sensor surface is touched, a consent signal assigned in terms of control technology to said partial surface section by the configuration device is generated only when the input force is below a predetermined maximum compressive force limit value and above a predetermined minimum compressive force limit value.

Mechanical consent switching means as such are generally known in the case of separate handheld robot operating devices and are sometimes also prescribed for safety reasons. Such consent switching means generally have a "panic function", that is to say a movement of the robot arm controlled by the handheld robot operating device is on the one hand only possible if the consent switching means is actuated manually—with a certain finger force. If the consent switching means is not actuated, no movements of the robot arm can take place. However, if the consent switching means actuated with a certain finger force is pressed beyond a maximum force, for example when a user reflexively cramps his fingers when startled, the consent switching means is, so to speak, "overcompressed" and a release of the robot arm to move is withdrawn immediately, that is to say the consent switching means is turned off. In the present embodiment variant according to the invention, the known mechanical consent switching means is in this respect replaced with a programmable, force-sensing touch consent switching means by the tactile sensor surface. It is particularly advantageous here that the maximum compressive force limit value and/or the minimum compressive force limit value can be individually adjustable and/or determinable in terms of control technology, in particular programming technology, that is to say in a software-configured manner.

The visual highlighting of the partial surface section of the tactile sensor surface and/or the activation of the visually highlighted partial surface section of the tactile sensor surface can be designed to be able to be switched off by the configuration device.

The visual highlighting of the partial surface section of the tactile sensor surface and/or the activation of the visually highlighted partial surface section of the tactile sensor surface can be switched off automatically by the configuration device after a predetermined period of time has elapsed.

The configuration device can be programmable with regard to the position, orientation and/or shape of the visually highlighted partial surface section of the tactile sensor surface and the respective type of the associated signal that is generated when said partial surface section of the tactile sensor surface is touched.

The configuration device can be designed and set up for its programming by means of a control device separate from the configuration device, in particular by means of the robot controller of the robot arm or a portable tablet computer.

In addition to the at least one display means for illuminating a specific partial surface section of the tactile sensor surface of the input means, the configuration device has at least one further display means, which is designed only to display other information without a specific partial surface section being associated with the tactile sensor surface.

Accordingly, at least one display means of the human-machine interface according to the invention can also be designed as a simple display means without an input function, such that the human-machine interface according to the invention can also represent additional displays independently of the formation of an input means. This can also be, for example, text, images or symbols that have explanatory or indicative functions without forming an input means in the process.

The tactile sensor surface can have a pressure-sensitive skin and/or capacitive proximity sensors. The tactile sensor surfaces can be designed, for example, in accordance with EP 2 528 234 B1.

The display means can have a flexible LED display.

The invention is summarized again in the following text, sometimes expressed differently.

Through the variable fading in of operating units, that is to say input means in an active robot skin, that is to say the surface of robot links, local areas of the robot arm can be allocated an input function. In this case, said local areas can always be selected in such a way that they are easily accessible for the user. This ensures that the operating elements are always accessible.

The visually represented operating elements or input means can, for example, be keys or sliders that can be programmed. This can be, for example, a button for teaching, a whole number field for inputting digits. A slider can be programmed, for example, so that, for example, an axle that is difficult to access by hand for manual adjustment, that is to say a joint, can be moved at the push of a button from another point on the robot arm, driven via input means on a, in particular different, link of the robot arm.

The function of variable fading in of programmed operating elements can be used in combination with tactile robot skin sensors, that is to say a tactile sensor surface. Here, an area of the robot skin is disregarded for the detection of unwanted collisions and, instead, specific functions are assigned. In this case, however, an unwanted collision of the robot cannot be detected.

The function of the variable fading in of operating elements in the robot skin can therefore also be able to be deactivated. This can ensure that all active areas of the robot skin can detect unwanted collisions.

The programming of the variable control panels can take place via software, for example in the form of an "app".

A tablet PC can be used to show the programmed control panels.

If necessary, the shown control panel can be provided with a time delay so that it is automatically deactivated after a programmed period of time.

When using capacitive skin sensors, the showing of operating elements can also be used.

For example, LEDs that can be programmed can be integrated into the active skin, which can be a tactile or capacitive skin. Programming means that, on the one hand, the LEDs can be switched on and off so that any symbols can be displayed and, on the other hand, a function is defined for the area of the skin in which the LEDs represent a symbol, said function being able to be carried out when said skin area is pressed manually. In this case, it is possible to program a force threshold value that must be exceeded in order to recognize an input.

Using the invention, the previous fixed location of input means is eliminated in favor of a dynamic arrangement of input means, that is to say the LEDs can be variably integrated, that is to say "appear", at several points in the skin. The LEDs can display any symbols (for example buttons, sliders, keypads, etc.) in any color. The symbols displayed can be linked to programmable functions. Force threshold values can be programmed to recognize an input and/or activation of a function. The skin control function can be activated by way of an operating element, for example on the robot foot by way of a mobile operating device.

The softness of the skin is not disturbed at this point. A deactivation of the collision detection can be provided for the area of the skin that is active for a programmed input. A programmable "time out" can be used to deactivate the faded-in symbols and/or functions.

Exemplary possibilities of one implementation are:

A hard shell can form a foundation for the human-machine interface according to the invention. An active skin (tactile or capacitive) can be attached to the hard shell. For example, a specially adapted fabric with integrated programmable LEDs can be drawn and fixed over the active skin.

A specific exemplary embodiment of the invention is explained in more detail in the following description with reference to the appended figures. Regardless of the specific context in which they are mentioned, specific features of this exemplary embodiment can represent general features of the invention, where necessary also considered individually or in further combinations.

DETAILED DESCRIPTION

Figure 1:
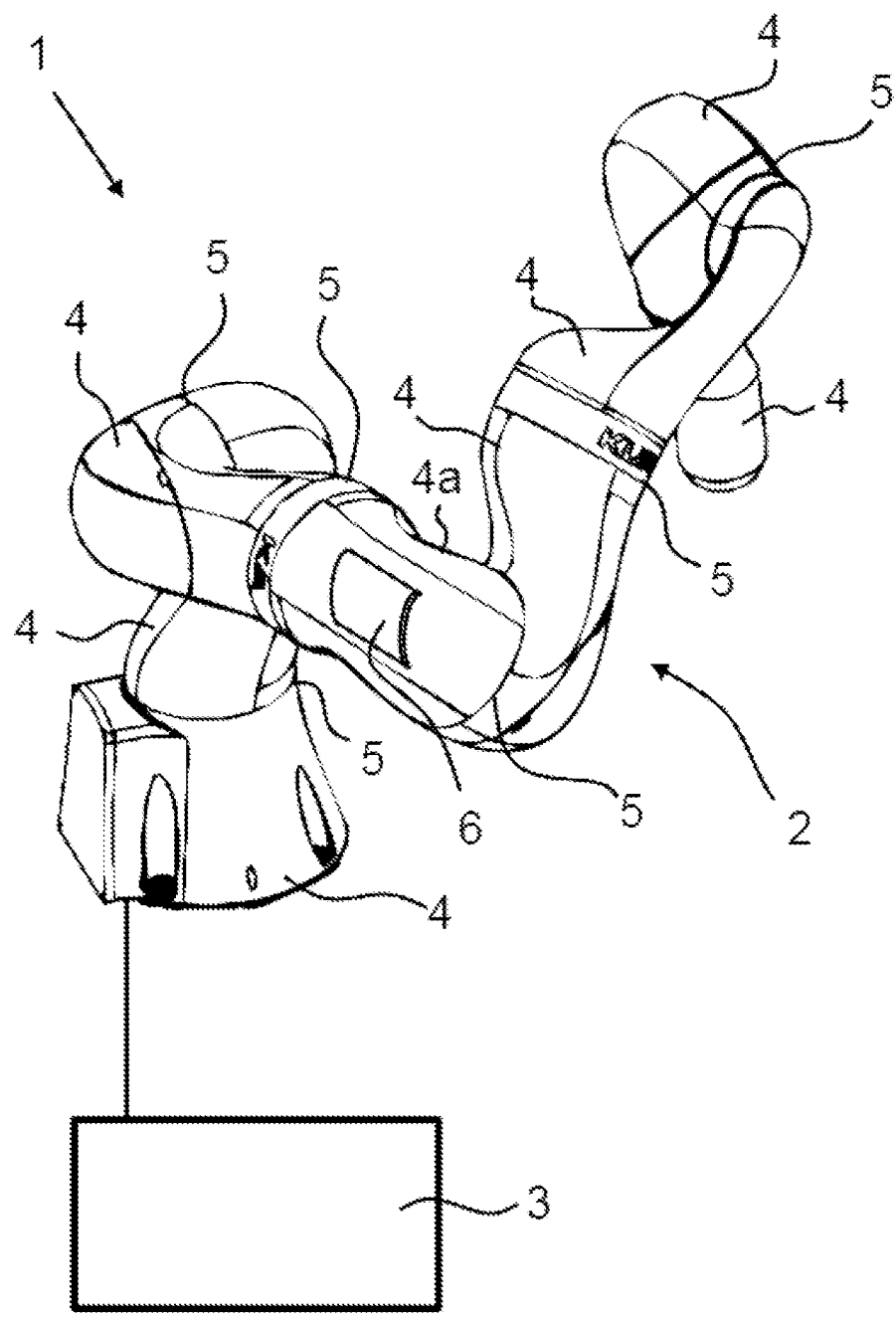
FIG. 1 shows an exemplary robot arm with a plurality of joints and links connecting said joints.

FIG. 1 shows a representative exemplary embodiment of a robot 1 with a robot arm 2 and an associated robot controller 3. The robot arm 2 has a plurality of links 4 and joints 5 that adjust the links 4 in relation to one another. Each joint 5 is driven by a respective joint motor of the robot arm 2. The robot controller 3 is designed and set up to actuate the joint motors in order to move the links 4 of the robot arm 2 by automatically adjusting the joints 5.

Accordingly, the robot arm 2 has a plurality of motor-driven joints 5 and a plurality of links 4, which each connect two adjacent joints 5 of said driven joints 5 to one another, wherein at least one of said links 4 has a load-bearing structural component designed to transmit forces and/or moments from an adjacent joint 5.1 to the other adjacent joint 5.2. In the case of the present exemplary embodiment, one link 4a of the plurality of links 4 is equipped with a human-machine interface 6. In general, however, two, more or even all of the links 4 of the robot arm 2 can each have their own human-machine interface 6.

Figure 2:
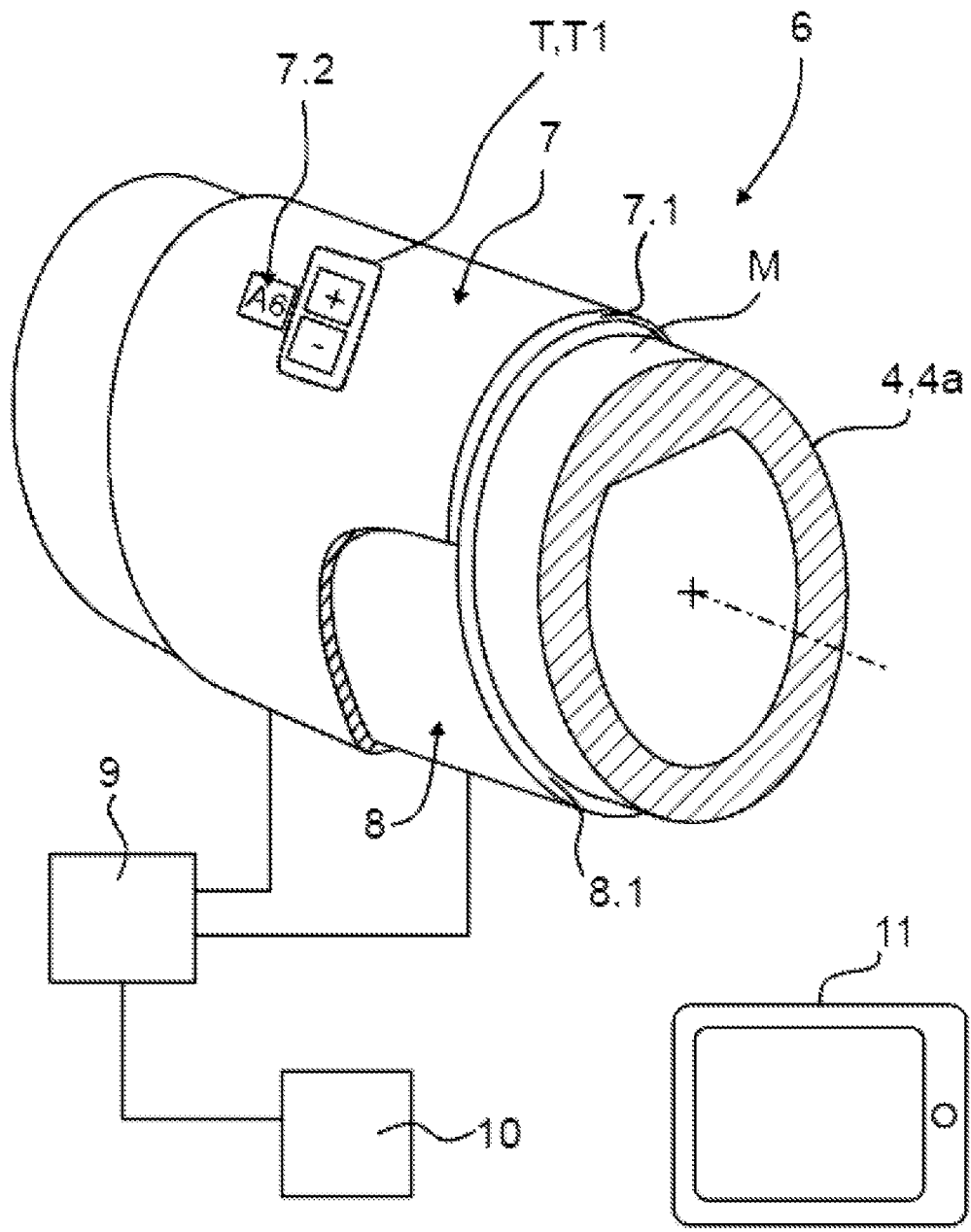
FIG. 2 shows a schematic sectional illustration through a representative link of a robot arm with a human-machine interface according to the invention in a first link position.
Figure 3:
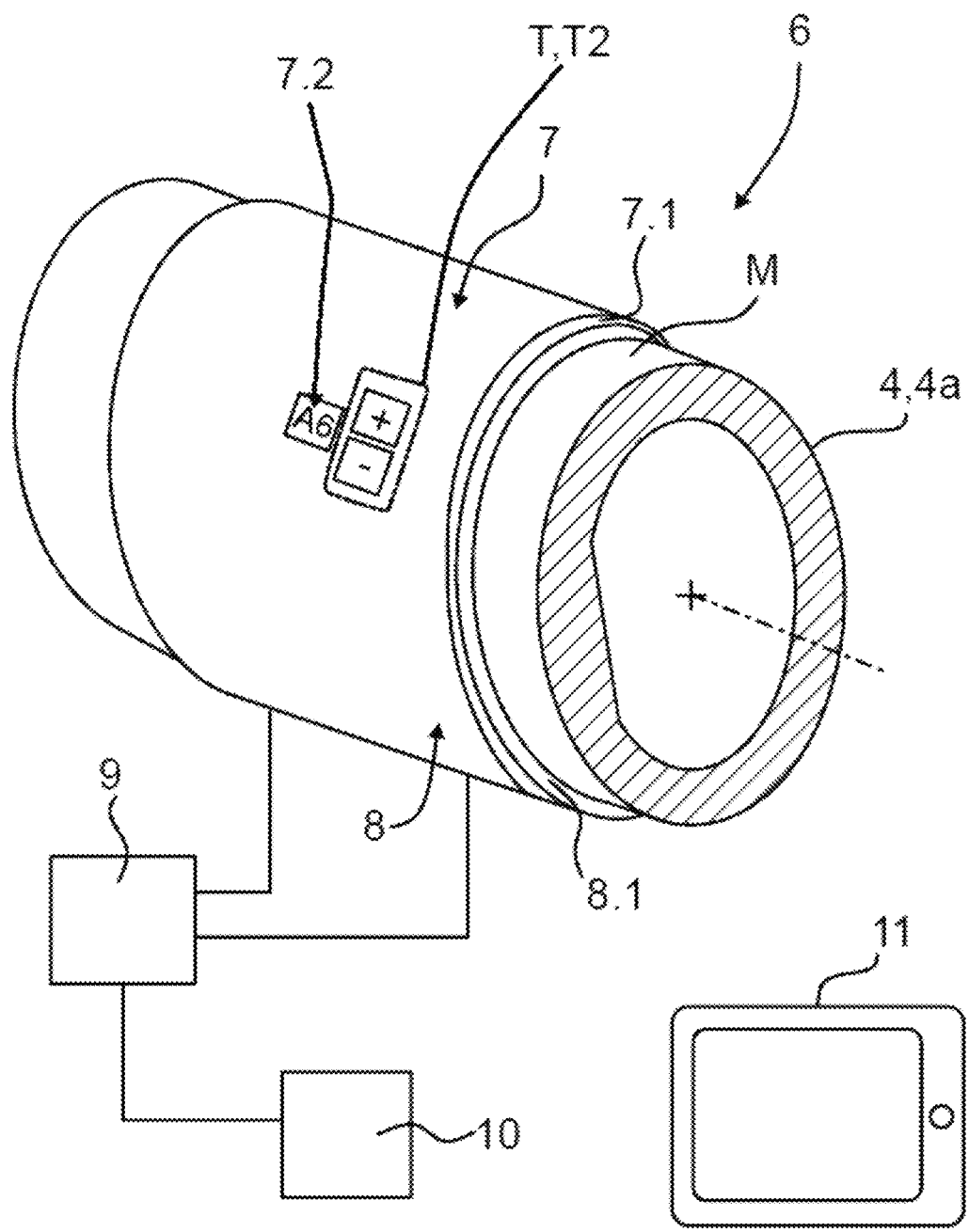
FIG. 3 shows a schematic sectional illustration through the link according to FIG. 2 in a second link position.

As shown schematically in FIG. 2 and FIG. 3, the human-machine interface 6 has at least one display means 7, which is designed to display at least one system state of the robot arm 2 and/or a control device 3 connected in terms of control technology to the robot arm 2. The human-machine interface 6 also has at least one input means 8, which is designed to supply at least one manual input via the human-machine interface 6 to the robot arm 2 and/or to the control device 3 connected in terms of control technology to the robot arm 2.

According to the invention, the at least one input means 8 comprises a tactile sensor surface 8.1 arranged on an outer casing wall M of the link 4, 4a and the at least one display means 7 comprises a display surface 7.1 superimposed on the tactile sensor surface 8.1. The human-machine interface 6 has a configuration device 9, which actuates the display means 7 and the input means 8 and is set up to visually highlight a specific partial surface section T of the tactile sensor surface 8.1 due to the superimposed arrangement of the display surface 7.1 and the tactile sensor surface 8.1 by illuminating said partial surface section T of the tactile sensor surface 8.1 of the input means 8 by means of the display means 7 and to activate said visually highlighted partial surface section T of the tactile sensor surface 8.1 separately in terms of control technology in such a way that, in the case of a compressive force exerted on said activated partial surface section T of the tactile sensor surface 8.1, a signal associated in terms of control technology with said partial surface section T by the configuration device 9 is generated and fed to an evaluation device 10 of the human-machine interface 6.

In the case of the present exemplary embodiment, the configuration device 9 is designed to dynamically illuminate either a first partial surface section T1 (FIG. 2) of the tactile sensor surface 8.1 or a second partial surface section T2 (FIG. 3) of the tactile sensor surface different from the first partial surface section T1.

The configuration device 9 is designed, in particular, to illuminate the optional first partial surface section T1 of the tactile sensor surface 8.1 or the optional second partial surface section T2 of the tactile sensor surface 8.1 with a similar representation, upon touching of which the same signal is generated in terms of control technology in order to activate the same function in both dynamic configurations, as shown in FIG. 2 and FIG. 3.

The configuration device 9 is designed, in particular, to dynamically illuminate either the first partial surface section T1 of the tactile sensor surface 8.1 or the second partial surface section T2 of the tactile sensor surface 8.1 different from the first partial surface section T1 depending on the current joint positions of the robot arm 2.

The configuration device 9 can be designed, in particular, to maintain the shape of the visually highlighted partial surface section T, T1, T2 of the tactile sensor surface 8.1 and, in the event of a change in the current position and/or orientation of that link 4*a* of the robot arm 2 that has the human-machine interface 6, to dynamically adapt the visually highlighted partial surface section T, T1, T2 of the tactile sensor surface 8.1 with regard to its position and/or orientation in such a way that a virtual input means 8 generated by the visual highlighting of the partial surface section T, T1, T2 of the tactile sensor surface 8.1 maintains its position and/or orientation in space.

The tactile sensor surface 8.1 of the at least one link 4*a* of the robot arm 2 that has the human-machine interface 6 is also designed and set up, in particular, to detect unintentional collisions of the link 4*a* with other objects, wherein, however, that partial surface section T, T1, T2 of the tactile sensor surface 8.1 that is activated to form the input means 8 in such a way that, when said activated partial surface section T, T1, T2 of the tactile sensor surface 8.1 is touched, a signal assigned in terms of control technology to said partial surface section T, T1, T2 by the configuration device 9 is generated, is deactivated for detection of an unintentional collision.

Alternatively, the tactile sensor surface 8.1 of the at least one link 4*a* of the robot arm 2 that has the human-machine interface 6 can be designed and set up to detect unintentional collisions of the link 4*a* with other objects and, in relation to a collision event, only generates a first signal characterizing the unintended collision when the collision force exceeds a predetermined compressive force limit value, wherein that partial surface section T, T1, T2 of the tactile sensor surface 8.1 that is activated to form the input means 8 in such a way that, when said activated partial surface section T, T1, T2 of the tactile sensor surface 8.1 is touched, a signal assigned in terms of control technology to said partial surface section T, T1, T2 by the configuration device 9 is generated, a second signal characterizing an input is generated only when the input force is below the predetermined compressive force limit value.

The visual highlighting of the partial surface section T, T1, T2 of the tactile sensor surface 8.1 and/or the activation of the visually highlighted partial surface section T, T1, T2 of the tactile sensor surface 8.1 can be designed to be able to be switched off by the configuration device 9.

The visual highlighting of the partial surface section T, T1, T2 of the tactile sensor surface 8.1 and/or the activation of the visually highlighted partial surface section T, T1, T2 of the tactile sensor surface 8.1 can be switched off automatically by the configuration device 9 after a predetermined period of time has elapsed.

The configuration device 9 can be programmable with regard to the position, orientation and/or shape of the visually highlighted partial surface section T, T1, T2 of the tactile sensor surface 8.1 and the respective type of the associated signal that is generated when said partial surface section T, T1, T2 of the tactile sensor surface 8.1 is touched.

The configuration device 9 is designed and set up, in particular, for programming by means of a control device separate from the configuration device 9, in particular by means of the robot controller 3 of the robot arm 2 or a portable tablet computer 11.

In addition to the at least one display means 7 for illuminating a specific partial surface section T, T1, T2 of the tactile sensor surface 8.1 of the input means 8, the configuration device 9 can have at least one further display means 7.2, which is designed only to display other information without a specific partial surface section T, T1, T2 being associated with the tactile sensor surface 8.1.

In the case of the present exemplary embodiment, the tactile sensor surface 8.1 is a pressure-sensitive skin and can also have capacitive proximity sensors. In the case of the present exemplary embodiment, the display means 7 has a flexible LED display.

What is claimed is:

1. A robot arm, having a plurality of joints (5) and a plurality of links (4), which each connect two adjacent joints (5) to one another, wherein:

at least one of said links (4, 4*a*) has a human-machine interface (6), comprising at least one display means (7), which is designed to display at least one system state of the robot arm (2) and/or of a control device (3) connected in terms of control technology to the robot arm (2), and comprising at least one input means (8), which is designed to supply at least one manual input via the human-machine interface (6) to the robot arm (2) and/or to a control device (3) connected in terms of control technology to the robot arm (2);

the at least one input means (8) comprises a tactile sensor surface (8.1) arranged on an outer casing wall (M) of the link (4*a*);

the at least one display means (7) comprises a display surface (7.1) superimposed on the tactile sensor surface (8.1);

the human-machine interface (6) has a configuration device (9), which actuates the display means (7) and the input means (8) and which is set up to visually highlight a certain partial surface section (T, T1, T2) of the tactile sensor surface (8.1) due to the superimposed arrangement of the display surface (7.1) and the tactile sensor surface (8.1) by illuminating said partial surface section (T, T1, T2) of the tactile sensor surface (8.1) of the input means (8) by means of the display means (7) and to activate said visually highlighted partial surface section (T, T1, T2) of the tactile sensor surface (8.1) separately in terms of control technology in such a way that, in the case of a compressive force exerted on said activated partial surface section (T, T1, T2) of the tactile sensor surface (8.1), a signal associated in terms of control technology with said partial surface section (T, T1, T2) by the configuration device (9) is generated and fed to an evaluation device (10) of the human-machine interface (6); and the tactile sensor surface (8.1) of the at least one link (4a) of the robot arm (2) that has the human-machine interface (6) is designed and set up to detect unintentional collisions of the link (4a) with other objects, wherein, however, that partial surface section (T, T1, T2) of the tactile sensor surface (8.1) that is activated to form the input means (8) in such a way that, when said activated partial surface section (T, T1, T2) of the tactile sensor surface (8.1) is touched, a signal assigned in terms of control technology to said partial surface section (T, T1, T2) by the configuration device (9) is generated, is deactivated for detection of an unintentional collision.

2. The robot arm as claimed in claim 1, wherein: the configuration device (9) is designed to dynamically illuminate either a first partial surface section (T1) of the tactile sensor surface (8.1) or a second partial surface section (T2) of the tactile sensor surface (8.1) different from the first partial surface section (T1).

3. The robot arm as claimed in claim 2, wherein: the configuration device (9) is designed to illuminate the optional first partial surface section (T1) of the tactile sensor surface (8.1) or the optional second partial surface section (T2) of the tactile sensor surface (8.1) with a similar representation, where, when touched, the same signal is generated in terms of control technology in order to activate the same function in both dynamic configurations.

4. The robot arm as claimed in claim 2, wherein: the configuration device (9) is designed to dynamically illuminate either a first partial surface section (T1) of the tactile sensor surface (8.1) or a second partial surface section (T2) of the tactile sensor surface (8.1) different from the first partial surface section (T1) depending on the current joint positions of the robot arm (2).

5. The robot arm as claimed in claim 4, wherein: the configuration device (9) is designed to maintain the shape of the visually highlighted partial surface section (T, T1, T2) of the tactile sensor surface (8.1) and, in the event of a change in the current position and/or orientation of that link (4a) of the robot arm (2) that has the human-machine interface (6), to dynamically adapt the visually highlighted partial surface section (T, T1, T2) of the tactile sensor surface (8.1) with regard to its position and/or orientation in such a way that a virtual input means (8) generated by the visual highlighting of the partial surface section (T, T1, T2) of the tactile sensor surface (8.1) maintains its position and/or orientation in space.

6. The robot arm as claimed in claim 2, wherein: the configuration device (9) is designed to dynamically illuminate either a first partial surface section (T1) of the tactile sensor surface (8.1) or a second partial surface section (T2) of the tactile sensor surface (8.1) different from the first partial surface section (T1) depending on the position of a person operating the human-machine interface (6) relative to the robot arm (2).

7. The robot arm as claimed in claim 1, wherein: the tactile sensor surface (8.1) of the at least one link (4a) of the robot arm (2) that has the human-machine interface (6) is designed and set up to form a consent switching means, wherein that partial surface section (T, T1, T2) of the tactile sensor surface (8.1) that is activated to form the consent switching means, when said activated partial surface section (T, T1, T2) of the tactile sensor surface (8.1) is touched, generates a consent signal assigned in terms of control technology to said partial surface section (T, T1, T2) by the configuration device (9) only when the input force is below a predetermined maximum compressive force limit value and above a predetermined minimum compressive force limit value.

8. The robot arm as claimed in claim 1, wherein: the visual highlighting of the partial surface section (T, T1, T2) of the tactile sensor surface (8.1) and/or the activation of the visually highlighted partial surface section (T, T1, T2) of the tactile sensor surface (8.1) is designed to be able to be switched off by the configuration device (9).

9. The robot arm as claimed in claim 8, wherein: the visual highlighting of the partial surface section (T, T1, T2) of the tactile sensor surface (8.1) and/or the activation of the visually highlighted partial surface section (T, T1, T2) of the tactile sensor surface (8.1) is switched off automatically by the configuration device (9) after a predetermined period of time has elapsed.

10. The robot arm as claimed in claim 1, wherein: the configuration device (9) is programmable with regard to the position, orientation and/or shape of the visually highlighted partial surface section (T, T1, T2) of the tactile sensor surface (8.1) and the respective type of the associated signal that is generated when said partial surface section (T, T1, T2) of the tactile sensor surface (8.1) is touched.

11. The robot arm as claimed in claim 10, wherein: the configuration device (9) is designed and set up for its programming by means of a control device separate from the configuration device (9), in particular by means of the robot controller (3) of the robot arm (2) or a portable tablet computer (11).

12. The robot arm as claimed in claim 1, wherein: in addition to the at least one display means (7) for illuminating a specific partial surface section (T, T1, T2) of the tactile sensor surface (8.1) of the input means (8), the configuration device (9) has at least one further display means (7.2), which is designed only to display other information without a specific partial surface section (T, T1, T2) being associated with the tactile sensor surface (8.1).

13. The robot arm as claimed in claim 1, wherein: the tactile sensor surface (8.1) has a pressure-sensitive skin and/or capacitive proximity sensors.

14. The robot arm as claimed in claim 1, wherein: the display means (7, 7.2) has a flexible LED display.

15. A robot arm, having:
a plurality of joints (5) and a plurality of links (4), which each connect two adjacent joints (5) to one another; and
a control device (3) operatively connected to adjust the plurality of joints to move the plurality of links,
wherein:
at least one of said links (4, 4a) has a human-machine interface (6), comprising at least one display (7), for displaying at least one system state of the robot arm (2) and/or of the control device (3), and the human-machine interface comprising at least one input means (8), which for supplying at least one manual input via the human-machine interface (6) to the robot arm (2) and/or to the control device (3);

the at least one input means (8) comprises a tactile sensor surface (8.1) on an outer casing wall (M) of the link (4*a*);

the at least one display means (7) comprises a display surface (7.1) superimposed on the tactile sensor surface (8.1);

the human-machine interface (6) has a configuration device (9), for actuating the display means (7) to visually highlight a certain partial surface section (T, T1, T2) by illuminating said partial surface section (T, T1, T2) in such a way that:

in the case of a compressive force exerted on said partial surface section (T, T1, T2), a signal associated with said partial surface section (T, T1, T2) by the configuration device (9) is generated and fed to an evaluation device (10) of the human-machine interface (6); and the tactile sensor surface (8.1) detects unintentional collisions of the link (4*a*) with other objects, wherein, however, that partial surface section (T, T1, T2) that is highlighted is deactivated for detection of an unintentional collision in such a way that, when said activated partial surface section (T, T1, T2) is touched, a control signal associated with said partial surface section (T, T1, T2) is generated.

16. The robot arm of claim 15 wherein:

for the partial surface section, said control signal is generated input only when the input force is below a predetermined compressive force limit value; and for the partial surface section, an unintended collision is detected when the input force is above the predetermined compressive force limit value.

17. The robot arm of claim 16 wherein:

for a further partial surface section said unintended collision is evaluated when the input force is above or below the predetermined compressive force limit value.

18. A method for operating a robot arm (2), the robot arm having:

a plurality of joints (5) and a plurality of links (4), which each connect two adjacent joints (5) to one another; and a controller (3), wherein:

at least one of said links (4, 4*a*) has a human-machine interface (6), comprising at least one touchscreen display (7), the method comprising:

highlighting a first partial surface section of the touchscreen;

evaluating pressure on said first partial surface section as a command input; and evaluating pressure on a second partial surface section of the touchscreen as indicating an unintentional collision.

19. The method of claim 18 wherein:

for the first partial surface section, said command input is evaluated only when the input force is below a predetermined compressive force limit value;

for the first partial surface section, an unintended collision is evaluated when the input force is above the predetermined compressive force limit value; and for the second partial surface section said unintended collision is evaluated when the input force is above or below the predetermined compressive force limit value.

* * * * *